July 16, 1929. E. E. FARIS 1,721,335
DEVICE FOR DISPLAYING AUTOMOBILES
Filed March 19, 1928 2 Sheets-Sheet 1
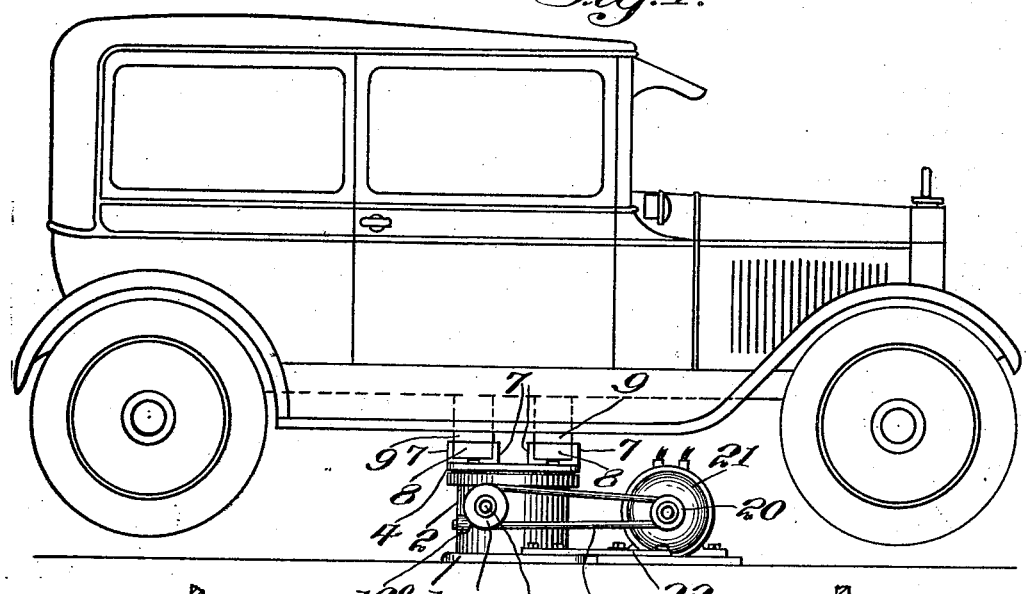
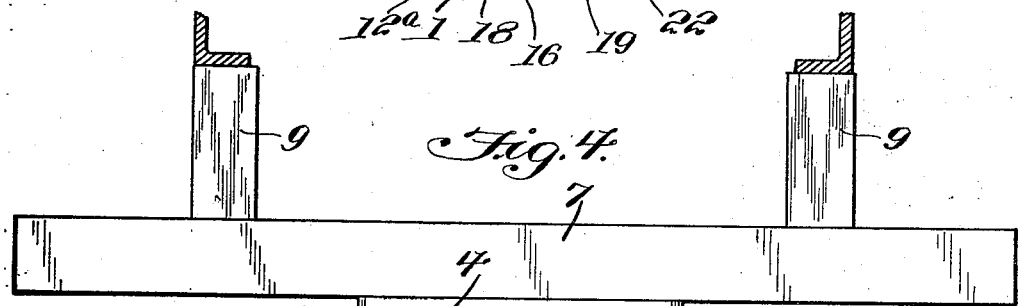
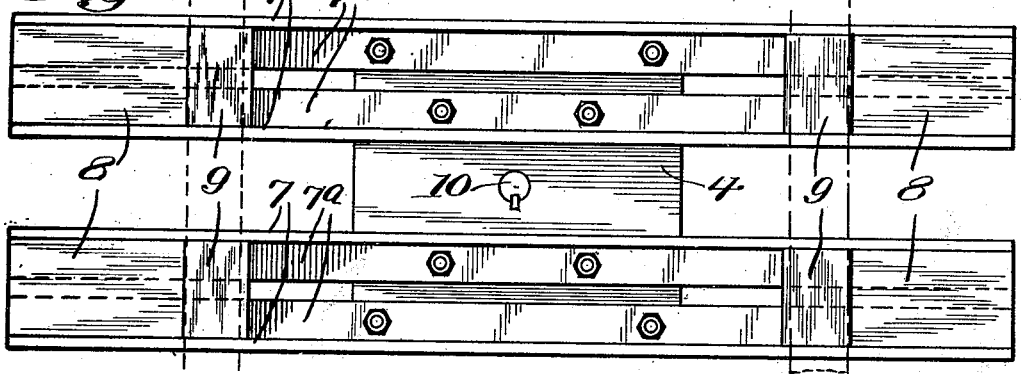
Inventor:
Edwin E. Faris
By Spear Middleton Donaldson & Hall
Attorneys July 16, 1929.  E. E. FARIS  1,721,335

DEVICE FOR DISPLAYING AUTOMOBILES

Filed March 19, 1928  2 Sheets-Sheet 2

Inventor:
Edwin E. Faris
By Spear, Middleton, Donaldson & Hall
Attorneys

Patented July 16, 1929.

1,721,335

UNITED STATES PATENT OFFICE.

EDWIN E. FARIS, OF CHATTANOOGA, TENNESSEE, ASSIGNOR OF ONE-THIRD TO M. E. BRYAN AND ONE-THIRD TO S. F. ZBINDEN, BOTH OF CHATTANOOGA, TENNESSEE.

DEVICE FOR DISPLAYING AUTOMOBILES.

Application filed March 19, 1928. Serial No. 262,842.

My said invention relates to a novel form of display device for exhibiting motor vehicles and aims to provide a simple self contained or complete device which may be readily installed and to which a motor vehicle may be readily applied whereby it may be kept continuously turning to attract the attention of observers and successively present all portions thereof to view without requiring the observers to walk around it.

The invention includes the novel features of construction and arrangement and combination of parts hereinafter described and defined by the appended claims.

What I at present consider the preferred embodiment of the invention is illustrated in the accompanying drawings in which:

Fig. 1 is a side elevation of the device or apparatus showing (in a conventional manner) a motor vehicle supported thereby.

Fig. 4 a detail view, and Fig. 5 is a plan view of the supporting bars.

Figure 2:
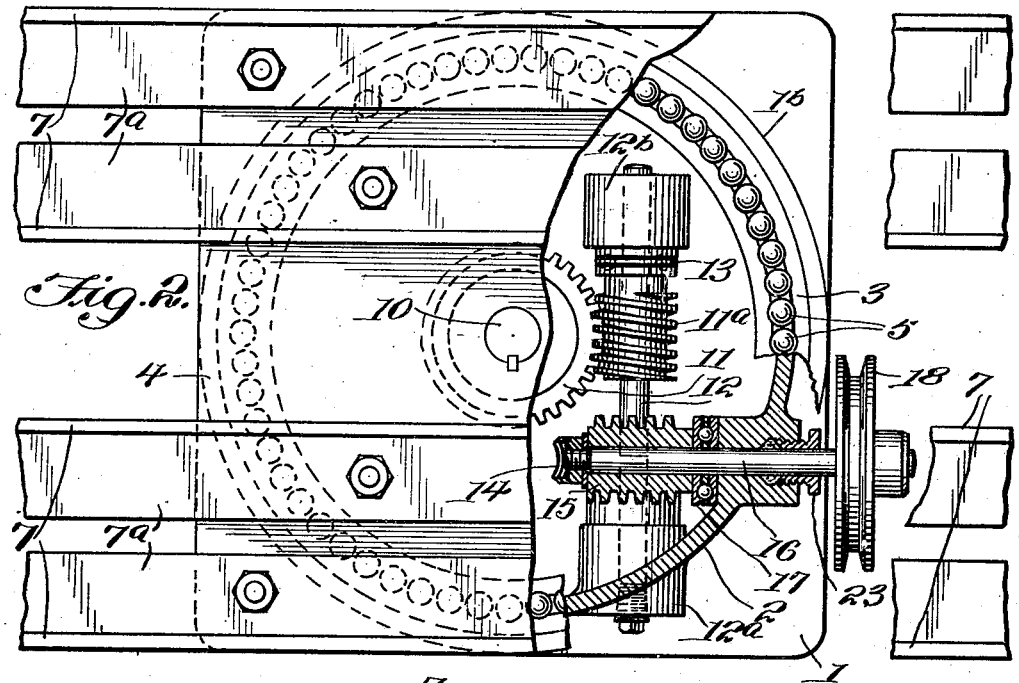
Fig. 2 is a plan view partly broken away and on a larger scale.
Figure 3:
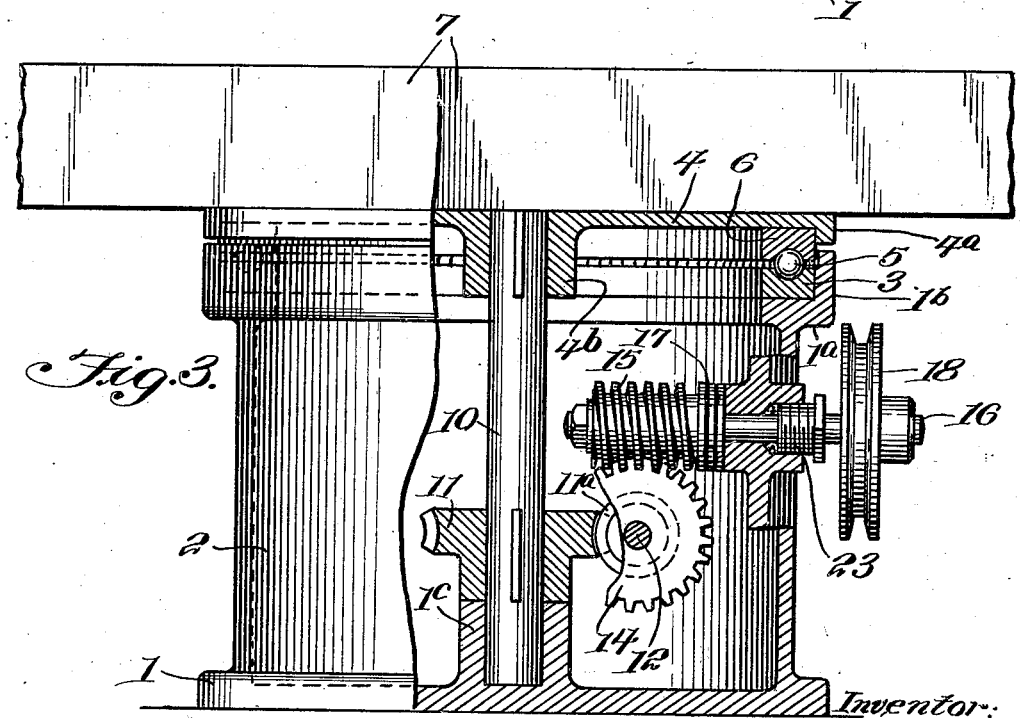
Fig. 3 is a side elevation also partly broken away.

Referring by reference characters to these drawings the numeral 1 designates a base of suitable size to afford stability from which rises a circular wall 2, preferably integral therewith, which carries at its upper edge an annular track 3 upon which is supported a turn table platform 4.

The track is preferably formed in the shape of a ball race member which is in the shape of an annular ring 3 having a ball receiving channel in its upper face for the reception of the balls 5. Said annular ring is supporting in an annular L shaped seat formed by a widened out portion $1^a$ at the upper edge of the wall 2, which widened out portion has an upstanding annular flange $1^b$ which abuts the outer circumferential edge of the ball race member 3.

The under side of the turn table 4 carries a ball race member 6 having a ball race channel in its under face alined with the channel in the member 3, and the table is preferably provided with a downwardly extending annular flange $4^a$ which abuts the outer peripheral edge of the ball race member 6.

Secured to the top of the table are a plurality of parallel motor vehicle supporting bars 7 of a sufficient length to extend beneath the side frame members of the motor vehicle. Preferably four of these bars are used arranged in pairs, each pair comprising two reversely placed L shaped members having their lower horizontal flanges $7^a$ resting upon the upper surface of the table and bolted or otherwise firmly secured thereto. Between the vertical flanges or webs of each set of bars I place filling pieces 8 which may be in the form of wooden blocks and which are positioned to lie beneath the side frame members of the motor vehicle.

In applying the motor vehicle to the device the body is jacked up and the supporting apparatus positioned thereunder with the bars 7 cross ways of the frame members of the motor vehicle and with the filling blocks 8 directly under said frame members, whereafter blocks 9 are inserted between the filling blocks 8 and the frame members.

Thereafter the body is lowered and, being supported wholly by the turn table, is free to be rotated for display purposes.

To enable it to be continuously rotated I provide the following means.

The base 1 is provided with a step bearing $1^c$ in which is journaled the lower end of a vertical shaft 10 disposed axially of the turn table. The upper end of the shaft is fixedly secured to the turn table, preferably by being seated in a tubular boss $4^b$ and being keyed thereto as shown in Fig. 2. Fast on the shaft 10 immediately above the step bearing $1^c$ is a worm gear 11 which meshes with a worm $11^a$ fast on a shaft 12 journaled in bearings $12^a$ and $12^b$, an antifriction thrust bearing being preferably provided as indicated at 13.

Shaft 12 carries another worm wheel or gear 14 which meshes with a worm 15 fast on shaft 16 and provided with thrust bearing 17 and carrying on its outer end a belt pulley 18 which is driven by means of a belt 19 from the drive pulley 20 of an electric motor 21 having its base bolted to a platform extension or bracket 22 secured to the base 1. By reason of the double worm drive and the antifriction bearings a very small electric motor is sufficient to slowly rotate the turn table and rotate the motor vehicle continuously for the purpose described.

The space within the chamber formed by the base 1 and its annular wall forms a lubricant chamber which may be filled with lubricant to keep the gearing submerged in oil. Shaft 16 is preferably provided with a stuffing box 23 to prevent the escape of oil.

Having thus described my invention what I claim is:

1. A device for displaying automobiles comprising a support, a turn table carried thereby, parallel cross bars carried by said turn table adapted to lie beneath the automobile crosswise thereof and support the same, and means for continuously rotating said turn table.

2. A device according to claim 1 in which the cross bars are formed of reversely placed L shaped members bolted to the turn table and are provided with filling blocks adjacent the ends thereof.

3. A device for displaying automobiles comprising a support having a circular ball race at the upper end, balls carried thereby, a turn table having on the under side a ball race engaging said balls, parallel cross bars carried by said turn table and projecting beyond the sides thereof, and means for continuously rotating said turn table.

4. A device for displaying automobiles comprising a hollow support adapted to form a lubricant reservoir, a turn table rotatably mounted on said support, means for supporting an automobile from said turn table, a vertical shaft journaled in said support and having its upper end keyed to said turn table, an electric motor located outside said support, and driving means interposed between said motor and shaft including reducing gearing within said hollow support.

5. A device for displaying automobiles comprising a base, a cylindrical supporting wall carried thereby and forming a lubricant reservoir, a turn table rotatably mounted on the upper end of said cylindrical wall, means for supporting an automobile body from said turn table, an electric motor supported by said base outside said hollow support, and driving means interposed between said motor and turn table, said driving means including reducing gearing within the lubricant chamber formed by said wall and base.

6. A device for displaying automobiles comprising a base, a circular wall rising therefrom, a turn table rotatably carried by said wall, means for supporting an automobile from said turn table, a step bearing carried by said base, a vertical shaft having its lower end journaled in said bearing and its upper end fast to said turn table, a worm wheel carried by said shaft, a worm engaging said worm wheel, and an electric motor carried by said base outside said hollow support and having driving connections to said worm.

7. A device for displaying automobiles comprising a base, a circular wall rising therefrom, a turn table rotatably carried by said wall, means for supporting an automobile from said turn table, a step bearing carried by said base, a vertical shaft having its lower end journaled in said bearing and its upper end fast to said turn table, a worm wheel carried by said shaft, a worm engaging said worm wheel, a shaft carrying said worm, a second worm wheel carried by said shaft, a worm engaging said second worm wheel, a shaft carrying said second worm, said shaft projecting through said wall and an electric motor carried by said base outside said support and having driving connections to the projecting portion of said shaft.

8. A device according to claim 7 in which the worm shafts are provided with antifriction thrust bearings.

9. A device for displaying automobiles comprising a base having a cylindric wall rising therefrom and having an enlarged upper end offset to form an annular horizontal seat and upstanding annular flange, a ball race carried by said seat and retained by said flange, a turn table having a downwardly turned annular flange, an inverted ball race retained thereby, a vertical shaft having its upper end secured to said turn table, said base having a step bearing for said shaft, motor means external to the casing, driving means connecting said motor and shaft, and parallel cross bars carried by said turn table.

10. Apparatus according to claim 9 in which the step bearing is in the form of an integral cylindric extension of the base, and the driving means includes a worm gear keyed to the shaft and having its hub resting on the top of said cylindric extensions.

11. A device for displaying automobiles comprising a support, a turn table carried thereby, parallel channel shaped supporting members carried by the turn table, and automobile frame engaging means located in the channels of the supporting members.

In testimony whereof, I affix my signature.

EDWIN E. FARIS.